United States Patent
Gejbrowitz et al.

(10) Patent No.: US 9,554,284 B2
(45) Date of Patent: Jan. 24, 2017

(54) WIRELESS OVER PON

(75) Inventors: Mordechai Gejbrowitz, Hod Hasharon (IL); Mordechai Zussman, Tel Aviv (IL); Dan Sade, Hod Hasharon (IL); Gil Shacham, Tel Aviv (IL)

(73) Assignee: ALVARION LTD., Tel Aviv (IL)

( * ) Notice: Subject to any disclaimer, the term of this patent is extended or adjusted under 35 U.S.C. 154(b) by 633 days.

(21) Appl. No.: 12/442,357

(22) PCT Filed: Sep. 24, 2007

(86) PCT No.: PCT/US2007/079322
§ 371 (c)(1),
(2), (4) Date: Mar. 20, 2009

(87) PCT Pub. No.: WO2008/036976
PCT Pub. Date: Mar. 27, 2008

(65) Prior Publication Data
US 2010/0040372 A1    Feb. 18, 2010

Related U.S. Application Data
(60) Provisional application No. 60/826,679, filed on Sep. 22, 2006.

(51) Int. Cl.
*H04J 14/00* (2006.01)
*H04W 16/26* (2009.01)
(Continued)

(52) U.S. Cl.
CPC ....... *H04W 16/26* (2013.01); *H04B 10/25754* (2013.01); *H04B 10/25751* (2013.01);
(Continued)

(58) Field of Classification Search
CPC ............ H04J 14/0282; H04Q 11/0067; H04W 88/085; H04B 10/25751; H04B 10/25752; H04B 10/25754; H04B 10/271
(Continued)

(56) References Cited

U.S. PATENT DOCUMENTS
6,882,801 B2 *  4/2005  Imajo ............................. 398/72
8,098,990 B2 *  1/2012  Hu et al. ........................ 398/72
(Continued)

FOREIGN PATENT DOCUMENTS
JP    2000-023246 A    1/2000
JP    2004-180202 A    6/2004
(Continued)

OTHER PUBLICATIONS
English translation of JP 2004-180202, Nov. 19, 2013.*
(Continued)

*Primary Examiner* — Tod T Van Roy
(74) *Attorney, Agent, or Firm* — Sughrue Mion, PLLC

(57) ABSTRACT

A system for communicating wireless signals includes a passive optical network (PON) between a central office (CO) and network subscribers. The CO has an optical line terminal (OLT) and a wireless base station. An RF/Optic converter converts base station radio frequency (RF) signals to and from corresponding optical signals. An optical combiner combines signals of the OLT and signals of the RF/Optic converter for communication over the PON with at least one optical network unit (ONU) at a location of one or more of the network subscribers, so that signals of the OLT and converted wireless base station signals are carried together over the PON. A fiber mounted wireless antenna unit (FMCA) having an optical interface and a wireless antenna, and communicating wireless signals of the wireless antenna with the ONU, including performing conversions between wireless RF signals and optical signals.

13 Claims, 4 Drawing Sheets

(51) Int. Cl.
*H04B 10/2575* (2013.01)
*H04B 10/27* (2013.01)
*H04W 88/08* (2009.01)

(52) U.S. Cl.
CPC ...... *H04B 10/25752* (2013.01); *H04B 10/271* (2013.01); *H04W 88/085* (2013.01)

(58) Field of Classification Search
USPC .......................................... 398/66–68, 70–72
See application file for complete search history.

(56) References Cited

U.S. PATENT DOCUMENTS

| | | |
|---|---|---|
| 2004/0184806 A1 | 9/2004 | Lee et al. |
| 2005/0025505 A1 | 2/2005 | Soto et al. |
| 2005/0188405 A1 | 8/2005 | Lee et al. |
| 2006/0018334 A1 | 1/2006 | Cho et al. |
| 2006/0045525 A1* | 3/2006 | Lee et al. ................ 398/71 |
| 2006/0182446 A1 | 8/2006 | Kim et al. |
| 2011/0055875 A1* | 3/2011 | Zussman ................ 725/65 |
| 2012/0066724 A1* | 3/2012 | Zussman ................ 725/65 |

FOREIGN PATENT DOCUMENTS

| | | |
|---|---|---|
| JP | 2005-136885 A | 5/2005 |
| JP | 2005-168043 A | 6/2005 |
| JP | 2005-229572 A | 8/2005 |
| JP | 2005-252980 A | 9/2005 |
| WO | 2004/073331 A2 | 8/2004 |
| WO | 2004/095776 A2 | 11/2004 |
| WO | 2005/057816 A1 | 6/2005 |

OTHER PUBLICATIONS

Office Action issued on Feb. 19, 2012 in Israeli Patent Application No. 197735.
Office Action issued on Feb. 7, 2012 in Japanese Patent Application No. 2009-529427.
Japanese Office Action mailed on Nov. 20, 2012 in Japanese Patent Application No. 2009-529427.
Communication from the European Patent Office issued Oct. 30, 2013 in a counterpart European Application No. 07 84 3080.
Imai, K., et al., "3G Cellular Phone Signal Optical Transmission over Gigabit E-PON System", Microwave Photonics, 2005. MWP 2005. International Topical Meeting on Seoul, Korea, Piscataway, NJ, USA, IEEE Oct. 12-14, 2005, pp. 47-50, XP010890772.
Koonen, T., Fiber to the Home/Fiber to the Premises: What, Where, and When? Proceedings of the IEEE, IEEE, New York. US, May 1, 2006, vol. 94, No. 5, pp. 911-934, XP011442737.
Luo, Y., et al., "Integrating Optical and Wireless Services in the Access Network", Optical Fiber Communication Conference, 2006 and The 2006 National Fiber Optic Engineers Conference, OFC 2006, IEEE, Piscataway, NJ, USA; Piscataway, NJ, USA, Jun. 19, 2006, p. 10 pp. XP031001324.

* cited by examiner

WIRELESS OVER PON

CROSS REFERENCE TO RELATED APPLICATIONS

This application is a National Stage of International Application No. PCT/US2007/079322 filed Sep. 24, 2007, claiming the benefit on U.S. Provisional Patent of Application No. 60/826,679, filed Sep. 22, 2006, the contents of all of which are incorporated herein by reference in their entirety.

FIELD OF THE INVENTION

The invention relates to a Passive Optical Network (PON) used to deliver native wireless signals into buildings, where a small Customer Premises Equipment (CPE) is used to transmit and receive the signals to and from the wireless devices.

BACKGROUND

One of the major challenges of wireless networks, such as cellular networks, is in-building coverage. Wireless antennas are typically located outside buildings, while in many cases the users are located inside the buildings. As a result, the wireless signals have to penetrate the walls of the buildings. While penetrating the walls, the signal is attenuated, causing degradation of the communication quality.

This challenge of in-building coverage is well known and there are some methods to address this challenge, mainly repeaters and in-building Distributed Antenna Systems (DAS). Both methods are typically used for highly populated locations, such as office buildings, public buildings, shopping centers and campuses.

Now a brief overview of PON architecture will be provided. A PON is an access network based on optical fibers. The network is built as a Point to Multi-point network, where a single optical interface, known as Optical Line Terminal (OLT), is located at the Central Office (CO) or Head-End (HE) and serves multiple users (typically 16 to 64 users). The OLT is connected via optical fiber (usually called feeder) to a passive splitter, which splits the optical signal among multiple optical fibers (usually called distribution lines or drops). The passive splitter may be located at the CO (centralized split) or at a passive cabinet in the field (distributed split). The distribution lines (or drops) terminate with an Optical Network Unit (ONU) which converts the optical signals to electrical signals. The ONU may be located at the subscriber's home (AKA FTTH—Fiber To The Home), at the subscriber's building (AKA FTTB) where the electrical signals are forwarded to the end users using the building's infrastructure (e.g. CAT 5) or at the curb (AKA FTTC) where the electrical signals are forwarded to the end users using copper wires (e.g. DSL). There are several flavors of PON, such as APON, BPON, EPON, GPON and GePON. All flavors share the same basic architecture of passive splitting and differ from each other by the data rate and the protocols. FIG. 1 illustrates a typical PON.

There is a need for improved in-building coverage for wireless communications such as cell phones, but no prior solution has effectively taken advantage of the possibilities of employing the PON architecture in this regard.

SUMMARY OF THE INVENTION

The invention addresses the challenge of in-building coverage for residential locations such as private houses and apartment buildings as well as commercial and public buildings. According to the invention, in which a Passive Optical Network (PON) is used to deliver native wireless signals into buildings, where a small Customer Premises Equipment (CPE) is used to transmit and receive the signals to and from the wireless devices, support is provided for multiple types of wireless technologies such as cellular technologies (i.e. GSM900, GSM1800, PCS, UMTS, CDMA, iDEN etc.), wireless LAN technologies (e.g. WiFi), WiMAX and other OFDM/OFDMA technologies.1.

According to one aspect of the invention, there is provided a system for communicating wireless signals, which includes a passive optical network (PON) between a central office (CO) and network subscribers, the CO having an optical line terminal (OLT) and a wireless base station. An RF/Optic converter converts base station radio frequency (RF) signals to and from corresponding optical signals. An optical combiner combines signals of the OLT and signals of the RF/Optic converter for communication over the PON with at least one optical network unit (ONU) at a location of one or more of the network subscribers, so that signals of the OLT and converted wireless base station signals are carried together over the PON.

A fiber mounted wireless antenna unit (FMCA) has an optical interface and a wireless antenna, and communicates wireless signals of the wireless antenna with the ONU, including performing conversions between wireless RF signals and optical signals. The FMCA obtains the converted wireless base station signals from the PON and converts them back to provide reconverted RF signals for transmission by the FMCA using the wireless antenna, and obtains wireless RF signals from the wireless antenna and converts them to provide optical signals for communication over the PON to the wireless base station at the CO. In this manner, the system provides wireless coverage at subscriber locations.

According to one embodiment, the FMCA and the ONU are integrated together.

Other embodiments involve whether the frequencies used over the PON are dedicated to the wireless communication signals or shared between the wireless signals and other signals carried over the PON.

BRIEF DESCRIPTION OF THE DRAWING FIGURES

The invention will be more easily understood by reference to the enclosed drawing figures, in which many specificities have been omitted so as to avoid obscuring the central principles of the invention. In the drawing figures.

Figure 3:
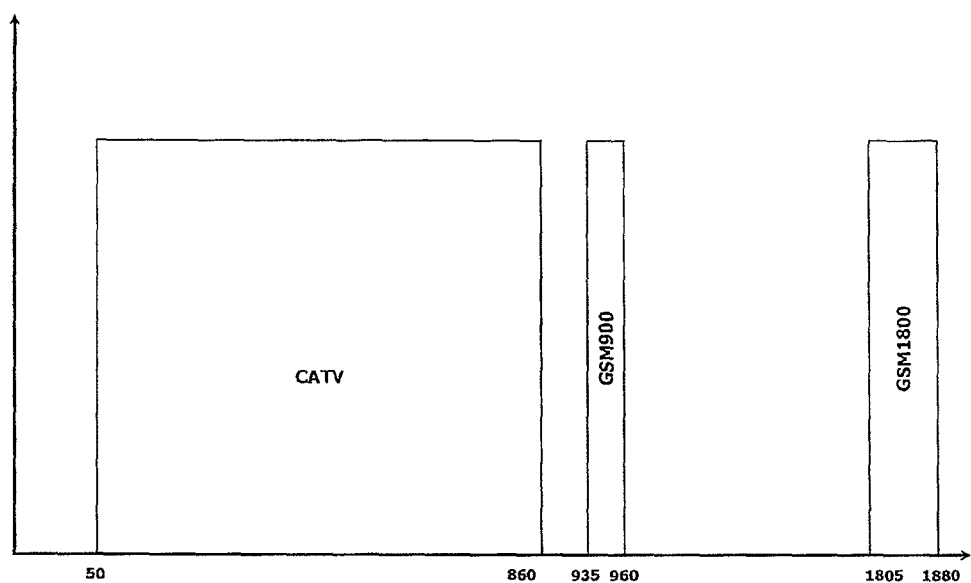

FIG. 3 describes the spectrum of a downlink wavelength which is shared by a CATV application and two wireless bands: GSM900 and GSM1800, according to one embodiment of the invention.

Figure 4:
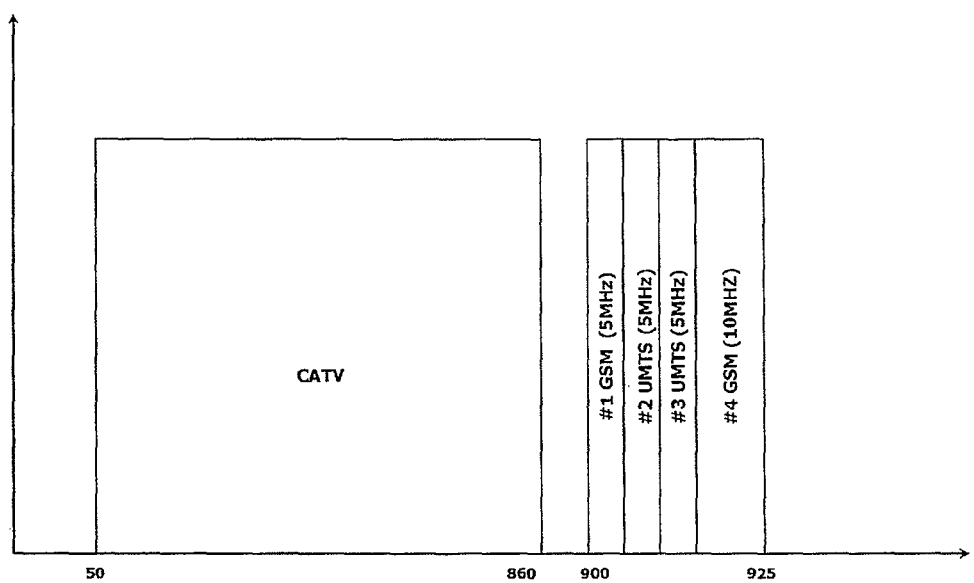

FIG. 4 describes the spectrum according to an embodiment of the invention in which signals are be shifted from the air frequency to a frequency which is not used by the PON application.

DETAILED DESCRIPTION OF THE PREFERRED EMBODIMENTS

The invention will be described in principle with respect to certain concrete embodiments mentioned below.

Although the discussion will serve to teach the reader the principles of the invention, it is not practical to describe any and every possible embodiment that might be thought of as part of the invention. Accordingly, the exemplary embodiments are provided for teaching the invention and the appended claims are provided to define the scope of subject matter that falls within the spirit of the invention.

Returning now to the discussion of PONs, two types of transmissions are used over PON: Digital Transmissions and RF Transmissions. Digital transmissions are typically used for internet access where the IP packets are carried over either ATM (e.g. APON, BPON and GPON) or Ethernet (e.g. EPON, GPON, GePON). Digital transmissions are typically bi-directional transmissions, where each direction is carried over a different wavelength. Typical wavelengths are 1310 nm for Upstream and 1490 nm (APON, BPON and GPON) or 1550 nm (EPON and GePON) for downstream. Another option, although less common, is to use a different fiber for each direction.

RF Transmissions are usually used for CATV transmissions at the downstream direction. The CATV RF signals are converted to optical signals, typically at wavelength of 1550 nm, and are forwarded along the PON to the ONU, which converts the optical signals back to RF signals. The RF output of the ONU is connected to the RF input of the CATV set-top box, allowing transmission of CATV signals over PON while using the existing CATV headend equipment and set-top boxes.

The following section describes a system in which the PON infrastructure is used to provide in-building wireless coverage. Even though the main application of such a system is in-building coverage, the system may be used for outdoor coverage as well, at locations where PON is deployed and the existing outdoor wireless coverage is insufficient.

According to the suggested invention, the native wireless signals are forwarded over the PON between the CO and each of the network's subscribers. A wireless base station is installed at the CO, preferably co-located with the OLT. The base station RF signals are converted to optical signals using an RF/Optic converter. The optical signals are combined with the OLT optical signals and propagated along the PON to the ONU. A small CPE, called FMCA (Fiber Mounted Cellular Antenna) equipped with an optical interface and a wireless antenna is installed at the subscriber home, preferably co-located or even integrated with the ONU. The FMCA separates the optical signals originated from the RF signals of the wireless base station and converts them back to RF signals. These RF signals are transmitted by the FMCA using a wireless antenna, providing a wireless coverage at the proximity of the FMCA.

At the upstream direction, the wireless signals are received by the FMCA and converted to optical signals. These signals are combined with the optical signals generated by the ONU and forwarded to the CO over the PON. Note that at the upstream direction the PON passive splitter acts as a combiner, combining optical signals generated by several FMCAs. The combined optical signal is received at the CO, where the optical signal originated from the FMCAs is converted back to RF signals. These signals are forwarded to the RF input of the wireless base station. In this way the base station receives all the signals that are received by the antennas of each one of the FMCAs.

The following sections describe several methods for combining the wireless signals with other signals of the PON. Note that each one of the methods can be implemented either at the upstream direction or the downstream direction and each direction can be implemented using a different method.

Dedicated Wavelength, Air Frequencies

Figure 1:
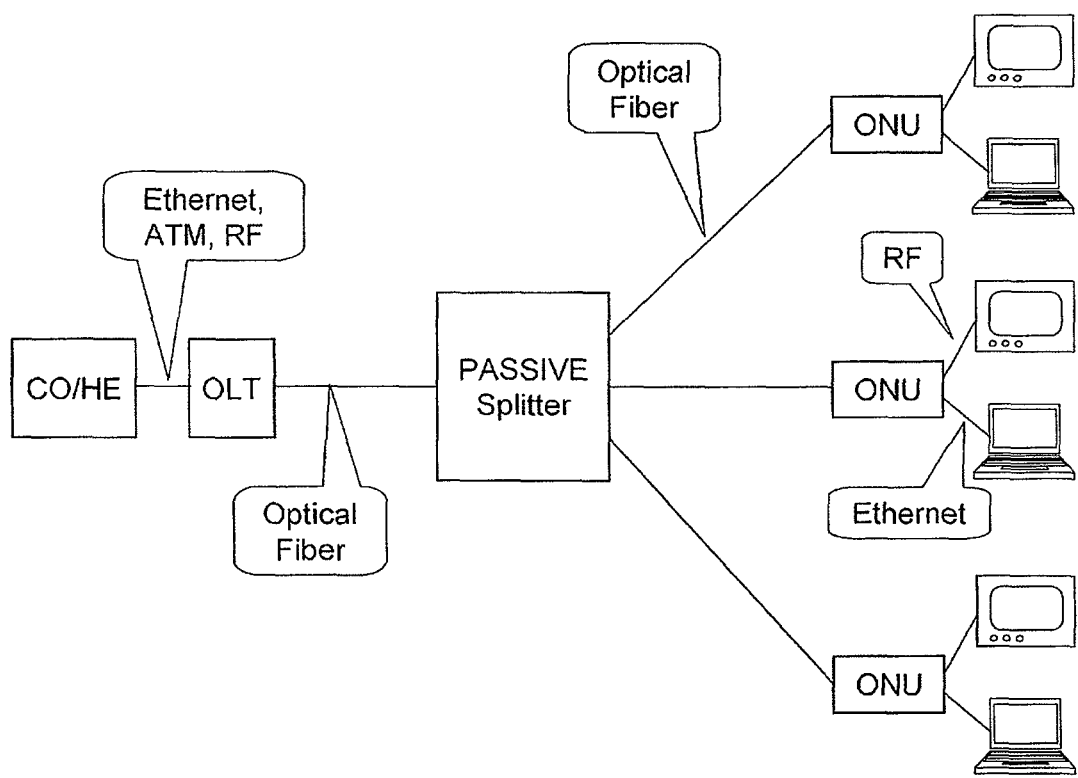
FIG. 1 shows in highly simplified schematic form a prior art PON architecture.
Figure 2:
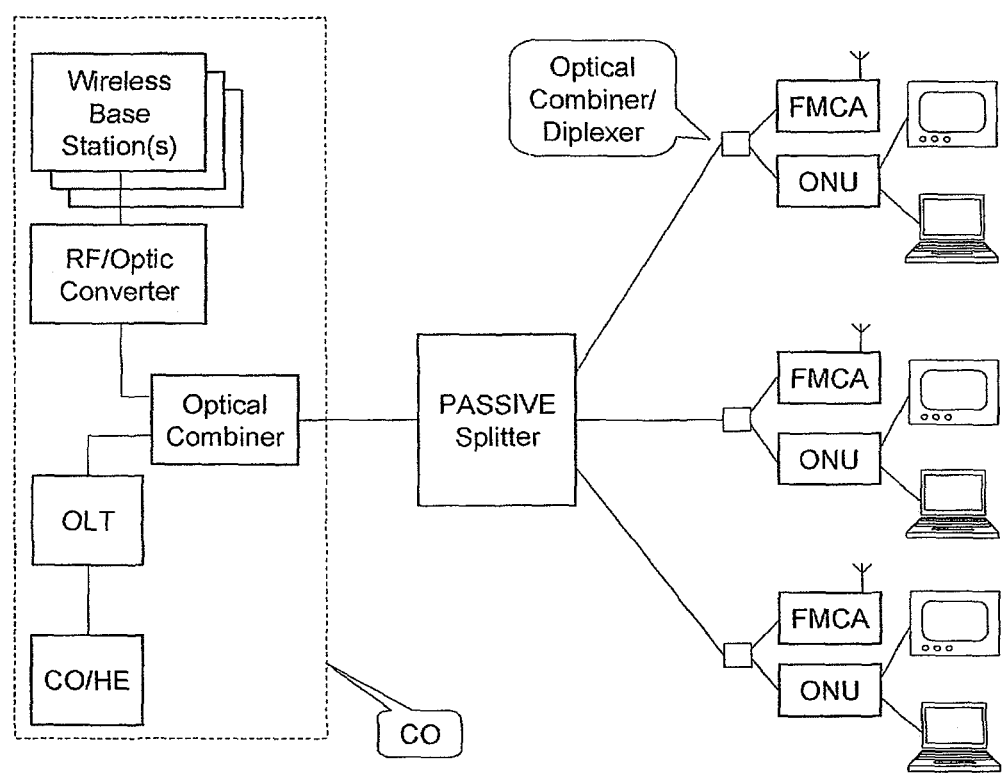
FIG. 2 shows in highly simplified schematic form a PON with wireless support according to one embodiment of the invention.

FIG. 2 shows a PON with wireless support.

As described previously, PON signals are carried over several wavelengths. Typically, wavelength of 1490 nm and 1550 nm are used for downstream traffic and wavelength of 1310 is used for upstream traffic. According to the proposed invention, the wireless signals are carried over additional wavelength which is not used by the PON. If the PON is implemented using a single fiber for both directions, then two wavelengths should be used—one for the wireless downstream signals and the other for the wireless upstream signals. The downstream wavelength carries downstream traffic of all the PON subscribers and the upstream wavelength carries the upstream traffic from all the PON subscribers. In the case of PON which is implemented using two fibers, one for each direction, the same wavelength can be used for both directions. Note that the wavelengths used for the wireless application should be in the range supported by the PON passive splitter. For example, in an EPON, which do not use the wavelength of 1490 nm, this wavelength can be used to carry the wireless traffic of one of the directions.

The RF signals are converted to optical signals at the dedicated wavelength as is, at the same frequencies that are used over the air, without any frequency conversions or any other processing. Since different technologies (e.g. UMTS, GSM) and different wireless (e.g. cellular) operators are using different frequencies, signals of different wireless networks (either same technology or different technologies, same operator or different operators) can be combined together and propagated over the same PON without any overlaps between the networks.

Dedicated Wavelength, Shifted Frequencies

The combining method described here is similar to the combining method described above. At both methods the RF signals are carried over a dedicated wavelength, however, in this method the frequency of the RF signals is shifted (or converted) in frequency, usually to lower frequency. Conversion of complete wireless band, such as GSM or UMTS band, from RF to optic and vice versa, requires expensive wideband RF/Optic converters. Since a wireless operator uses only small portion of the band (e.g. 10 MHz), this portion of the band can be shifted to a lower frequency, converted to optical signals, converted back to RF frequency at the other end of the network and shifted back the original frequency. In this way narrower band and cheaper components can be used. This method can also support multiple wireless networks by shifting the actual band of each network to a different frequency band at one end of the PON and shift it back to the original air frequency at the other end of the PON.

Shared Wavelength, Air Frequencies

FIG. 3 describes the spectrum of a downlink wavelength which is shared by a CATV application and two wireless bands: GSM900 and GSM1800.

In some cases, a single wavelength can be shared by the existing PON application and the wireless application. If the wireless RF frequency range is below or above the frequency range used by the existing PON application, then the two signals can be combined before the conversion from RF to optic. This is actually a Frequency Division Multiplexing (FDM) where each application uses its own frequency range. The combined signal is converted from optic to RF and RF to optic at the other end of the network using a single RF/Optic converter.

For example, in some BPON or GPON network the 1550 nm wavelength is used to carry CATV signals in the frequency range of 50 MHz to 860 MHz. Since GSM900 networks utilize frequencies above 900 MHz for downlink signals, the GSM900 downlink signals may be combined with the CATV RF signals before the conversions from RF to optic at the headend/CO. At the remote end of the network, after the conversion from optic to RF, the signals can be separated using filters. The lower band below 860 MHz is routed to the CATV receiver (e.g. set-top box) and the upper band above 900 MHz is routed to the FMCA for transmission over the air. Note that multiple wireless networks can be supported at this met-hod as well, as long there is no overlap between the frequency range used by the wireless network and the frequency range used by the existing PON application. For example, a wavelength used for CATV cannot be shared with a wireless network that uses frequency range below 860 MHz.

Shared Wavelength, Shifted Frequencies

As mentioned above, converting a wideband RF signal to optic signal and vice versa requires expensive wideband RF/Optic converters. The method introduced in "Shared Wavelength, Air Frequencies" requires RF/Optic conversion of the combined range of the existing PON application and the wireless network. Considering the example described in that section, the frequency range used by the CATV application starts at 50 MHz and ends at 860 MHz. Combining this signal with a UMTS signal will result with total bandwidth of more than 2 GHz. In order to reduce the bandwidth (and the cost) of the RF/Optic converters, the UMTS signals can be shifted from the air frequency to a frequency which is not used by the PON application. See FIG. 4. The frequency shift can take place on the entire wireless band (e.g. the entire UMTS band) or on a portion of the band which is actually used by the wireless operator (e.g. 5 MHz per carrier within the UMTS band). In the case of multiple networks, the signals of each network can be shifted to a different, unused frequency range. The following diagram describes the spectrum of a downlink wavelength which is shared by a CATV application and four wireless networks, two GSM networks and two UMTS networks. The total bandwidth used by these networks is 25 MHz.

As one familiar with this field will appreciate, many variations and modifications can be made without departing from the scope and spirit of the invention. Various alternatives have been presented above and others will occur to the interested reader.

The invention claimed is:

1. A system for communicating wireless signals, comprising:
   a native passive optical network (PON) between a central office (CO) and network subscribers, the CO having an optical line terminal OLT connected to an optical combiner and a plurality of wireless base stations connected through a RF/Optic converter to the optical combiner;
   wherein the RF/Optic converter is configured to receive said wireless base stations radio frequency (RF) signals, wherein said wireless base stations RF signals are signals of multiple types of wireless networks and convert said wireless base stations RF signals to and from corresponding optical signals, and shifting a band of each of said base station RF signals to a different frequency band of said PON according to a shared wavelength shifted frequencies process to yield a reduced bandwidth of the RF/Optic converter;
   wherein the optical combiner combines signals of the OLT and signals of the wireless base stations for communication over the PON with at least one optical network unit (ONU) at a location of one or more of the network subscribers, whereby signals of the OLT and converted wireless base station signals are carried together over the PON;
   a fiber mounted wireless antenna unit (FMCA) having an optical interface and a wireless antenna, and communicating wireless signals of the wireless antenna with the ONU, including performing conversions between wireless RF signals and optical signals;
   wherein the FMCA obtains the converted wireless base stations signals from the PON and converts them back to provide reconverted RF signals for transmission by the FMCA using the wireless antenna, and obtains wireless RF signals from the wireless antenna and converts them to provide optical signals for communication over the PON to one of the wireless base station at the CO, thereby providing wireless coverage at the location of the one or more of the network subscribers.

2. The system for communicating wireless signals as set forth in claim 1, wherein the FMCA and the ONU are integrated together.

3. The system for communicating wireless signals as set forth in claim 1, wherein the wireless signals converted to optical signals are carried over the PON on dedicated frequencies.

4. The system for communicating wireless signals as set forth in claim 1, wherein the wireless signals are combined with other RF signals to be carried over the PON prior to the conversion to optical signals.

5. The system for communicating wireless signals as set forth in claim 4, wherein the native frequency of the wireless signals is frequency-converted prior to conversion to optical signals.

6. A central office (CO) configured to operate in the system as set forth in claim 1.

7. A fiber mounted wireless antenna unit (FMCA) configured to operate in the system as set forth in claim 1.

8. The system for communicating wireless signals as set forth in claim 1, wherein the wireless network types are selected from the group consisting of GSM900, GSM1800, PCS, UMTS, CDMA, iDEN, WiFi, WiMAX, and OFDM/OFDMA technologies.

9. The system for communicating wireless signals as set forth in claim 1, wherein the plurality of wireless base stations comprise a first wireless base station and a second wireless base station and wherein the first base station transmits a first type of RF signals of the wireless base station RF signals different from a second type RF signals of the wireless base station RF signals transmitted by the second wireless base station.

10. The system for communicating wireless signals as set forth in claim 9, wherein the first type of RF signals and the second type of RF signals are in different frequency bands.

11. The system for communicating wireless signals as set forth in claim 9, wherein the first type of RF signals and the second type of RF signals are two of a GSM900 type of RF signals, GSM1800 type of RF signals, PCS type of RF signals, UMTS type of RF signals, CDMA type of RF signals, iDEN type of RF signals, WiFi type of RF signals, WiMAX type of RF signals, and OFDM/OFDMA type of RF signals.

12. The system for communicating wireless signals as set forth in claim 1, wherein one type of the wireless networks comprises UMTS signals, and the UMTS signals are shifted from an air frequency to a frequency not used by the PON.

13. The system for communicating wireless signals as set forth in claim 1, wherein signals of each of the plurality of wireless networks are shifted to a different, unused frequency range of the PON such that four wireless networks and CATV application share a bandwidth of approximately 25 GHz.

\* \* \* \* \*